(12) United States Patent
Cavressi et al.

(10) Patent No.: US 10,539,107 B2
(45) Date of Patent: Jan. 21, 2020

(54) FUEL INJECTION UNIT AND FUEL FEEDING ARRANGEMENT

(71) Applicant: WARTSILA FINLAND OY, Vaasa (FI)

(72) Inventors: Franco Cavressi, Vaasa (FI); Dave Jay, Vaasa (FI)

(73) Assignee: WARTSILA FINLAND OY, Vaasa (FI)

( * ) Notice: Subject to any disclaimer, the term of this patent is extended or adjusted under 35 U.S.C. 154(b) by 27 days.

(21) Appl. No.: 14/783,677

(22) PCT Filed: Apr. 9, 2013

(86) PCT No.: PCT/FI2013/050387
§ 371 (c)(1),
(2) Date: Oct. 9, 2015

(87) PCT Pub. No.: WO2014/167166
PCT Pub. Date: Oct. 16, 2014

(65) Prior Publication Data
US 2016/0061169 A1    Mar. 3, 2016

(51) Int. Cl.
*F02M 63/00* (2006.01)
*F02M 43/04* (2006.01)
(Continued)

(52) U.S. Cl.
CPC ......... *F02M 63/0005* (2013.01); *F02B 9/02* (2013.01); *F02B 15/00* (2013.01); *F02M 43/02* (2013.01);
(Continued)

(58) Field of Classification Search
CPC ......... F02M 63/0005; F02M 63/0028; F02M 59/00; F02M 43/02; F02M 43/04;
(Continued)

(56) References Cited

U.S. PATENT DOCUMENTS

| | | | |
|---|---|---|---|
| 4,782,794 A | * | 11/1988 | Hsu ............... F02D 19/04 123/23 |
| 4,807,811 A | * | 2/1989 | Aketa ............. F02M 47/02 123/447 |

(Continued)

FOREIGN PATENT DOCUMENTS

| | | |
|---|---|---|
| EP | 0 546 985 A1 | 6/1993 |
| EP | 0 778 410 B1 | 6/1997 |

(Continued)

OTHER PUBLICATIONS

International Search Report and Written Opinion of the International Preliminary Examining Authority dated Oct. 21, 2013 for International Application No. PCT/FI2013/050387.

(Continued)

*Primary Examiner* — Hung Q Nguyen
*Assistant Examiner* — Brian P Monahon
(74) *Attorney, Agent, or Firm* — Heslin Rothenberg Farley & Mesiti P.C.; Victor A. Cardona, Esq.

(57) ABSTRACT

A fuel injection unit for assembly to a cylinder head and for injecting first and second fuel to a cylinder of an internal combustion piston engine includes a first fuel feeding section, a second fuel feeding section, a pressure accumulator in the first fuel feeding section, and a flow fuse arranged in the first fuel feeding section between the pressure accumulator and a fuel injection valve of the first fuel feeding section. The fuel injection valve includes a fuel handling section and control section, and the control section is a hydraulic control section fluidly separated from the fuel handling section.

15 Claims, 1 Drawing Sheet

(51) Int. Cl.
*F02B 9/02* (2006.01)
*F02B 15/00* (2006.01)
*F02M 43/02* (2006.01)
*F02M 59/00* (2006.01)

(52) U.S. Cl.
CPC ............ *F02M 43/04* (2013.01); *F02M 59/00* (2013.01); *F02M 63/0028* (2013.01)

(58) Field of Classification Search
CPC ............ F02M 37/0064; F02M 63/029; F02M 2200/95; F02M 2200/40; F02M 2200/16; F02B 15/00; F02B 9/02; F02D 19/0692; F02D 19/10; Y02T 10/36
See application file for complete search history.

(56) References Cited

U.S. PATENT DOCUMENTS

| | | | | |
|---|---|---|---|---|
| 5,097,803 | A * | 3/1992 | Galvin | F02D 19/0647 123/1 A |
| 5,355,856 | A * | 10/1994 | Paul | F02M 45/10 123/446 |
| 6,276,334 | B1 * | 8/2001 | Flynn | F02B 19/14 123/435 |
| 6,298,833 | B1 * | 10/2001 | Douville | F02D 19/0684 123/27 GE |
| 7,028,672 | B2 * | 4/2006 | Glenz | F02D 19/0605 123/457 |
| 7,055,511 | B2 * | 6/2006 | Glenz | F02M 37/10 123/497 |
| 7,208,022 | B2 * | 4/2007 | Corkwell | B01F 17/0021 44/331 |
| 9,765,707 | B2 * | 9/2017 | Krug | F02D 19/0628 |
| 2002/0002964 | A1 * | 1/2002 | Kohketsu | F02D 41/221 123/447 |
| 2003/0234012 | A1 * | 12/2003 | Bosteels | B01D 53/9431 123/670 |
| 2004/0055574 | A1 * | 3/2004 | Namekawa | F02M 45/00 123/447 |
| 2004/0118116 | A1 * | 6/2004 | Beck | F02B 1/12 60/601 |
| 2006/0144368 | A1 * | 7/2006 | Knight | F02M 55/025 123/447 |
| 2009/0134246 | A1 * | 5/2009 | Cooke | F02D 19/0694 239/533.12 |
| 2009/0271090 | A1 * | 10/2009 | Surnilla | F02D 19/0628 701/103 |
| 2009/0292443 | A1 * | 11/2009 | Stein | F02D 19/081 701/103 |
| 2010/0170470 | A1 * | 7/2010 | Pursifull | F02D 41/20 123/299 |
| 2011/0011369 | A1 * | 1/2011 | Jaasma | F02D 19/0647 123/304 |
| 2012/0247441 | A1 * | 10/2012 | Schultz | F02P 17/04 123/609 |
| 2013/0006457 | A1 * | 1/2013 | Anders | E02F 9/2075 701/22 |
| 2013/0047964 | A1 * | 2/2013 | Kim | F02M 63/008 123/478 |
| 2013/0048750 | A1 * | 2/2013 | Kim | F02M 43/04 239/11 |
| 2013/0118448 | A1 * | 5/2013 | Kim | F02M 63/029 123/299 |

FOREIGN PATENT DOCUMENTS

WO 01/79685 A2 10/2001
WO 2012/072881 A1 6/2012

OTHER PUBLICATIONS

Written Opinion of the International Preliminary Examining Authority dated Mar. 16, 2015 for International Application No. PCT/FI2013/050387.

International Preliminary Report on Patentability dated Jul. 14, 2015 for International Application No. PCT/FI2013/050387.

* cited by examiner

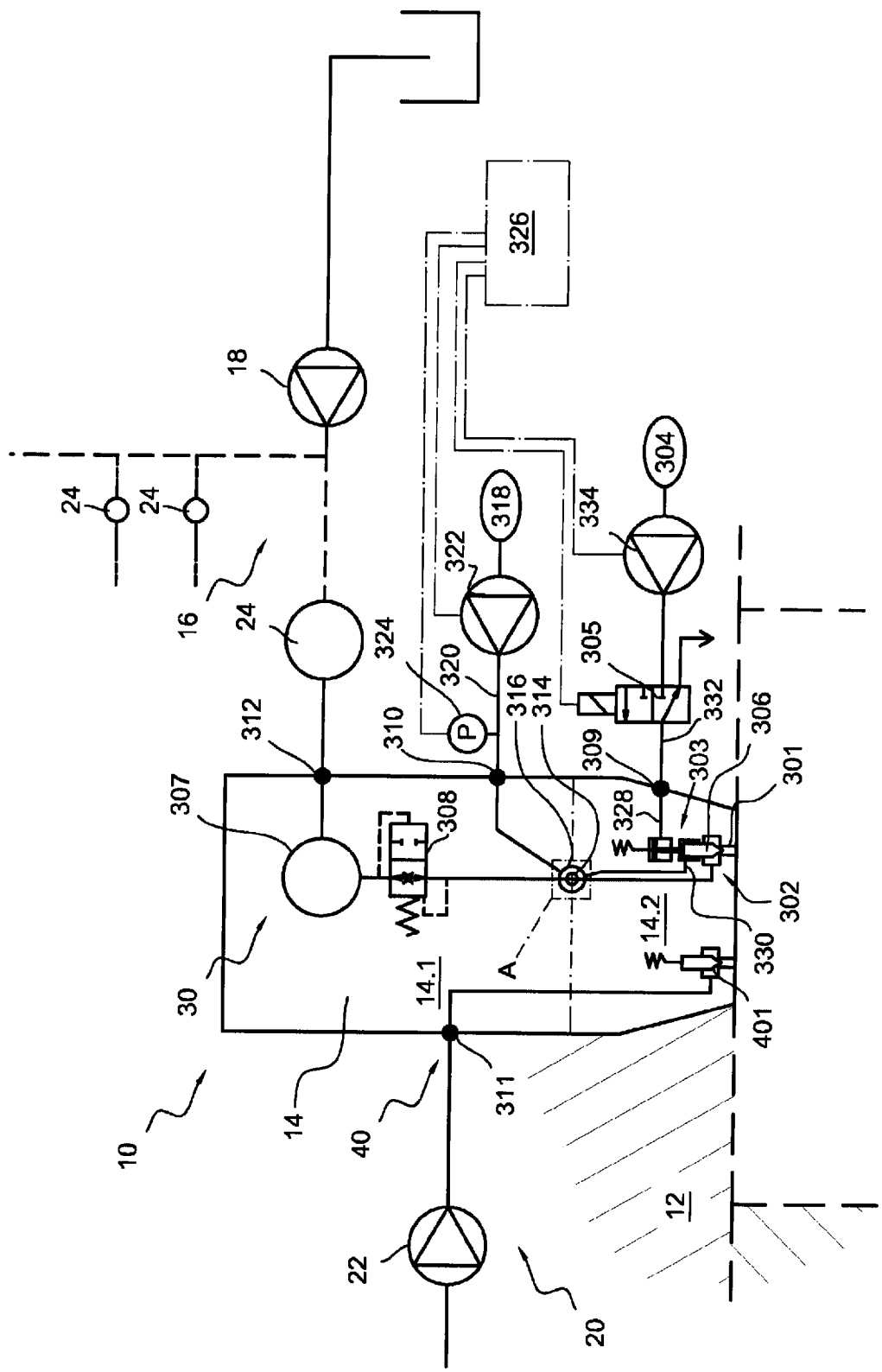

FUEL INJECTION UNIT AND FUEL FEEDING ARRANGEMENT

CROSS REFERENCE TO RELATED APPLICATIONS

This application is a national stage filing under section 371 of International Application No. PCT/FI2013/050387, filed on Apr. 9, 2013, and published in English on Oct. 16, 2014, as WO 2014/167166 A1, the entire disclosure of this application being hereby incorporated herein by reference.

BACKGROUND ART

A so called "common rail injection" or "common pressure injection" is known as such for injecting fuel into a combustion chamber of internal combustion piston engines. In such a system the provision of pressurize the fuel and controlling the injection of fuel are functionally separated from each other. Fuel is fed by means of at least one high pressure fuel pump into a pressure supply, i.e. rail, from which it is led through separate pipes into the injector or injection valve of each cylinder. In practice, the operation of an injector is electronically controlled, for instance by means of a solenoid or piezoelectric valve, in order to obtain a sufficiently short and precise injection.

A number of the most obvious problem areas of traditional fuel feeding systems have been solved by the use of a high pressure (up to about 2200 bar) fuel supply, and electronically controlled fuel injection valves by means of which it is, for instance, possible to inject fuel into an engine cylinder several times during the same combustion stroke. In other words, the timing of the injection, the duration of the injection and the quantity of injected fuel is in clearly better control than with the fuel injection pumps of prior art, whereby also the emission levels in normal operating conditions of a piston engine have been drastically reduced.

It is known in prior art to arrange a piston engine operate by making use of two different fuels. Typically a gaseous fuel, such as natural gas is used as the main fuel and a liquid fuel, such as LFO or diesel fuel oil, is used to ignite the mixture of air and gaseous fuel present in the combustion chamber of the engine.

As an example of a fuel injection system for dual fuel, particularly gaseous and liquid fuels, EP 0778410 B1 discloses an injection valve arrangement for an internal combustion engine, especially a large so called gas diesel engine. The arrangement comprises an engine cylinder head, first valve means in the form of at least two needle valves or the like for injecting gaseous fuel directly into a cylinder of the engine. There is also a second valve means in the form of a needle valve or the like, for injecting so called pilot fuel into the cylinder in order to enrich the mixture therein for ignition. Control of the operation of the gas needle valves is arranged by means of a common control valve preferably under electrical control. In addition, the valve needles of the gas needle valves are mechanically connected to each other so that the movements thereof occur concurrently.

A piston engine operating as prime mover to run a generator for producing electricity may be adapted to use various different fuels. There is a need to provide fuel injection system for a large engine capable of using methane as primary fuel.

An object of the present invention is to provide a fuel injection unit and arrangement using the unit which provides improved performance in dual fuel piston engine particularly using liquid alcohol, such as methanol as its fuel.

DISCLOSURE OF THE INVENTION

In this specification the term "large engine" refers to such internal combustion engines in which more than 150 kW power per cylinder may be generated. Typically, this kind of large engines are used, for example, as main propulsion engines or auxiliary engines in marine vessels or in power plants for the production of heat and/or electricity. Additionally LFO, MDO, diesel fuel oil or alike are commonly called as LFO in this context.

Objects of the invention are met by a fuel injection unit for assembly to a cylinder head and for injecting first and second fuel to a cylinder of an internal combustion piston engine, the fuel injection unit comprising a first fuel feeding section, a second fuel feeding section, a pressure accumulator in the first fuel feeding section, a flow fuse arranged in the first fuel feeding section between the pressure accumulator and a fuel injection valve of the first fuel feeding section.

It is characteristic to the invention that the fuel injection valve comprises a fuel handling section and control section, and the control section is a hydraulic control section fluidly separated from the fuel handling section.

According to an embodiment of the invention the fuel handling section is arranged to handle the introduction and metering the liquid alcohol fuel into the combustion chamber by at least one control needle in the fuel injection valve.

According to an embodiment of the invention the second fuel feeding section is arranged to a pilot i.e. ignition fuel for compression ignition purposes. The amount of pilot fuel injected may be 1 to 5% of the LFO specific fuel oil consumption in diesel mode at maximum load of the engine.

The second fuel feeding section is may also be used alone as backup system in diesel mode.

According to an embodiment of the invention the fuel injection unit is provided with a flow channel for the control fluid separated from the first fuel section connected to a control valve external to the fuel injection unit.

According to an embodiment of the invention the pressure of the control fluid is arranged to determine the operational status of the injection valve when in use.

According to an embodiment of the invention the unit comprises at least two successive parts and the first fuel section extends from the first part to the second part and that the crossover location comprises a first sealing system and that the first sealing is surrounded by a sealing chamber connectable to a source of sealing liquid when in use.

According to an embodiment of the invention the first fuel section between the flow fuse and the fuel injection valve is arranged to cause a pressure loss of less than 200 bar in all operational circumstances of the valve unit.

According to an embodiment of the invention the control section is provided with a control valve, which is arranged to apply the pressure of control fluid system to the control section of the valve which causes closing of the at least one control needle, and to depressurize the control section, which causes the opening of the at least one control needle.

Objects of the invention are met by a fuel feeding arrangement comprising a first fuel system with at least one high pressure fuel pump which is arranged to pressurize the fuel to the injection pressure, and a second fuel system with at least one high pressure fuel pump which is arranged to pressurize the fuel to the injection pressure. The arrangement comprises a fuel injection unit according anyone of the claims 1-8, and the control section is provided with a control valve, which is arranged to apply the pressure of control fluid system to the control section of the valve which causes closing of the at least one control needle, and to depressurize the control section, which causes the opening of the control needle and that the control valve is arranged externally to the valve unit.

According to an embodiment of the invention the control section is connected with the control valve by an external pipe.

According to an embodiment of the invention the valve unit comprises at least two successive parts and that the first fuel section extends from the first part to the second part and that the crossover location comprises a first sealing system and that the first sealing is surrounded by a sealing chamber connectible to a source of sealing liquid when in use, wherein the sealing chamber is connected to an external source of sealing liquid.

According to an embodiment of the invention the first fuel system comprises a secondary pressure accumulator dedicated for the first fuel feeding section of the fuel injection unit.

According to an embodiment of the invention the total volume of the integrated accumulator and the secondary accumulator is designed so that their capacity is of 20 to 60 times the injection quantity during one combustion stage.

BRIEF DESCRIPTION OF DRAWING

In the following the invention will be described with the reference to the accompanying schematic drawing, in which FIG. 1 illustrates an embodiment of fuel feeding arrangement according to the invention.

DETAILED DESCRIPTION OF DRAWING

FIG. 1 describes a fuel feeding arrangement 10 in an internal combustion engine 12, which engine is depicted only by a schematic partial presentation of a cylinder and a cylinder head. The fuel feeding arrangement comprises a fuel injection unit 14, which is suitable for assembly to the cylinder head of an engine, and in the FIG. 1 being assembled in such a cylinder head. Further the fuel feeding arrangement 10 comprises a first fuel system 16 with at least one high pressure fuel pump 18 which is arranged to pressurize the first fuel to the injection pressure, and a second fuel system 20 with at least one high pressure fuel pump 22 which is arranged to pressurize the second fuel to the injection pressure. The first fuel system is arranged to feed liquid alcohol, such as methanol and the second fuel system is arranged to feed LFO.

The fuel injection unit 14 comprises two separate fuel feeding sections 30, 40 for separate fuels. The fuel injection unit 14 is provided with communication ports 309, 310, 311, 312 via which the unit is coupled to the external system.

The second fuel feeding section 40 in all the embodiment of the invention may be any fuel injection system apparent to a skilled person in the art suitable for injection LFO as a pilot i.e. ignition fuel for compression ignition purposes. The second fuel feeding section 40 comprises an injection needle 401 which may be used for injecting pilot fuel when the engine is operating in dual fuel mode or main fuel when the engine is operating in diesel mode. In the FIGURE the injection needle is controlled by fuel pressure against a spring force.

The first fuel feeding section 30 is coupled to the first fuel system 16 of the engine, and the second fuel feeding section 40 is coupled to the second fuel system 20. The first fuel feeding system 16 and the fuel feeding section 30 of the unit are adapted to handle liquid alcohol, such as methanol, and the second fuel injection system 20 and the fuel feeding section 40 of the fuel injection unit 10 are adapted to handling LFO. The second fuel system 20 and the second fuel feeding section 40 of the injection unit 14 are used as pilot system by means of which a small amount of LFO may be injected into the combustion chamber to ignite the combustible mixture therein when the unit is used in dual fuel mode. Thus the valve unit is a dual fuel injection unit arranged to inject two separate fuels in successive order at least once during each combustion stage of a cylinder in the engine. Both fuels are injected via the same unit 10 directly into a combustion chamber of the engine. The second fuel system 20 and the second fuel feeding section 40 of the injection unit 14 may also be used alone for injecting main fuel e.g. as a backup system when the engine is operated in diesel mode.

The first fuel feeding section 30 of the fuel injection unit 10 comprises a first fuel injection valve 301 arranged at a first end of the injection unit 10, which is assembled to open in the combustion chamber. The fuel injection valve 301 comprises a fuel handling section 302 and control section 303. The fuel handling section 302 is arranged to handle the introduction and metering of the liquid alcohol fuel into the combustion chamber by a control needle 306 in the valve 301. In the FIG. 1 there is shown only one control needle 306, but the number of control needles 306 as well as injection valves 301 may be different in different applications.

In such an embodiment in which there are more than one fuel injection valve 301 the injection needle 401 of the second fuel feeding section 40 is arranged to the middle area of the valve unit 14 and the fuel injection valves 301 of the first fuel feeding section 30 are placed symmetrically around the injection needle 401 of the second fuel feeding section 40. Also in such embodiment the first fuel feeding section 30 may comprises several injection valves 301 including the control section 303 and the fuel handling section 302. Alternatively the control section 303 of the injection valve 301 may be arranged to control several fuel handling sections 302. In such a case the control needles 306 of several fuel handling sections 302 are mechanically connected to a single actuation piston of the control section 303.

The control section 303 is a hydraulic control section arranged control the operation i.e. position of the control needle 306. In the fuel injection valve 201 the fuel handling section and the control section are separated from each other in such a manner that the first fuel and the control fluid are not substantially or intentionally mixed with each other. The control section is arranged to operate in hydraulic manner the fuel section with a control fluid which is separate from the fuel in the fuel section. In other words the control section is a hydraulic control section fluidly separated from the fuel handling section. In practice there is a sealing arrangement between the sections. Such a sealing arrangement may be sealing arrangement apparent to a skilled person in the art. The fuel injection valve 301 is this way adapted to operate with and inject methanol. The control section 303 is connected to a control fluid system 304 which is arranged to produce pressurized control fluid for the control section 303.

The control section 303 is provided with a control valve 305, which is arranged to apply the pressure of control fluid system 304 to the control section 303 of the valve 301 which causes closing of the control needle 306, and to depressurize the control section 303, which cases opening of the control needle 306. The control section comprises for example an arrangement in which the control fluid is acting on a piston being capable to lift the piston and the control needle 306 up against a spring's force when pressurized. The piston is mechanically connected to the control needle 306 and to the free end of the spring that keeps it down when the control section 303 is not pressurized.

The control valve 305 is arranged externally to the valve unit 10 connected to a communication port 309 in the fuel injection unit 14 operating as an inlet of the control section 303 for the fuel injection unit 10. The control valve 305 is arranged into an external pipe 332 which is provided with a pump 334. This way a more efficient use of the space under a rocker cover cap of the engine is achieved. In the FIG. 1 the control valve 305 is an electronically operated 32 way valve. In some applications of the invention it may be feasible to combine the source of sealing liquid and control fluid system. In some cases it may be feasible to use a common pump as well. According to an embodiment of the invention lubrication oil is used for both the source of sealing liquid 316 and the control fluid system 304, whether being separate or combined system.

In the embodiment of FIG. 1 the fuel injection unit 10, and more specifically the first fuel feeding section 30 thereof, comprises a pressure accumulator 307 integrated within the fuel injection body of the injection unit 10. Additionally the first fuel system 16 comprises a secondary pressure accumulator 24 dedicated for the first fuel feeding section 30 of the fuel injection unit 10. The total volume of the integrated accumulator 307 and the secondary accumulator 24 is designed so that the capacity is of 20 to 60 times the injection quantity during one combustion stage. The total volume is shared between the internal accumulator 307 and the secondary pressure accumulator 24 case by case as necessary. The first fuel feeding section 30 is designed so that not more than 200 bar pressure drop between the accumulator 307 and the injection valve 301 may emerge during one injection.

In the first fuel feeding section 30 of the fuel injection unit 10 there is a flow fuse valve 308 arranged between the accumulator 307 and the injection valve 301. Flow fuse valve is a device allowing only a predetermined amount of fluid flow at one instance and is design is apparent to a skilled person in the art. The flow fuse valve 308 is integrated within the body of fuel injection unit 10, in close proximity of a gallery of the fuel injection valve 301. This arrangement allows only minimal amounts of residual methanol leakage in case of a failure in the needle valve functionality.

The fuel injection unit 14 comprises at least two parts 14.1, 14.2. The first fuel section 30 extends from the first part 14.1 to the second part 14.2. The crossover location of the first fuel feeding section 30 at the boundary between the parts 14.1, 14.2 comprises a first seating system 314 circumscribing the conduit. In the FIGURE there is shown a view A along the plane of the boundary at the crossover location. There additionally a chamber 316 is arranged surrounding the sealing system 314. The chamber is here annular but the form may be of different form. The chamber is formed e.g. by providing grooves to the parts of the unit facing each other. The chamber 316 is connected to an external source of sealing liquid 318, preferably oil via an external communication line 320 of pressurized sealing oil. With this arrangement it is ensured that the connections of the fuel channels between different parts 14.1, 14.2 of the fuel injection unit 14 are free from potentially hazardous leakages of liquid alcohol used as the fuel in the first fuel feeding section 30. This kind of sealing chamber and its auxiliaries are provided preferably in each corresponding crossover location.

Even if in the FIGURE there is shown the secondary accumulator 24 in the first fuel feeding system 16, there may be special cases when the pressure accumulator 307 which is integrated within the fuel injection body of the injection unit 10 constitutes the total accumulator volume, for the injection unit 14. Also in this embodiment the accumulator 307 is designed so that the capacity is of 20 to 60 times the injection quantity during one combustion stage, and the first fuel feeding section 30 is designed so that not more than 200 bar pressure drop between the accumulator 307 and the injection valve 301 may emerge during one injection.

In FIGURE there is shown also an additional feature relating to the sealing of the crossover of the first fuel section which extends from the first part 14.1 to the second part 14.2. The communication line is provided with a pressurizing means, such as a pump 322 and a pressure monitoring and control system 324, 326. This may be operated so that the chamber 316 is pressurized to a pressure which is higher than the pressure of the fuel in the first fuel feeding section 30 at least at the location of the crossover. The pressure is monitored by the pressure monitoring system 324, 326 and maintained at desired level by the pump 322 Since the pressure of the sealing oil 318 is higher than the pressure of the fuel in the feeding section 30 the sealing oil may escape to the fuel feeding section 30 and is combusted in the engine. The pressure monitoring system comprises a pressure sensor connected to a process controller 326.

According to an embodiment of the invention, in case a leak is detected e.g. by detecting superfluous operation time of the pump, the process controller will force the engine to immediately switch its mode of operation from methanol mode to diesel mode, while at the same time the sealing all pressure would be still maintained at its normal set level. With this arrangement it is ensured that the connections of the fuel channels between different parts 14.1, 14.2 of the fuel injection unit 14 are free from potentially hazardous leakages of liquid alcohol used as the fuel in the first fuel feeding section 30.

In FIG. 1 there is also shown an embodiment in which the sealing functionality of the sealing fluid is extended to the needle guide, preventing any liquid alcohol from leaking upwards past the needle gallery. This is represented in the FIGURE by a communication line 330 which connects the sealing oil groove or the chamber 316 to the fuel handling section 302 of the fuel injection valve 301. The sealing fluid to the needle guide may be led also by a dedicated line (not shown) from the external communication line 320. This provides an advantageous system for preventing alcohol base fuel leakage to the control fluid.

It is to be noted that only a few most advantageous embodiments of the invention have been described in the above. Thus, it is clear that the invention is not limited to the above-described embodiments, but may be applied in many ways within the scope of the appended claims. The features disclosed in connection with various embodiments can also be used in connection with other embodiments within the inventive scope and/or different assemblies can be combined from the disclosed features, should it be desired and should it be technically feasible.

The invention claimed is:

1. A fuel injection unit for assembly to a cylinder head and for injecting first and second fuel to a cylinder of an internal combustion piston engine, the fuel injection unit comprising:

a first fuel feeding section in the fuel injection unit for injecting a liquid alcohol fuel to the internal combustion engine, the first fuel feeding section having an injection valve, and a second fuel feeding section in the fuel injection unit, separate from the first fuel feeding section, for injecting a liquid fuel to the internal combustion engine, the second fuel feeding section having an injection needle, a pressure accumulator in the first fuel feeding section arranged within a body of the injection unit, a flow fuse arranged in the first fuel feeding section between the pressure accumulator and a fuel injection valve of the first fuel feeding section in the fuel injection unit, in which the fuel injection valve in the first fuel feeding section comprises a fuel handling section and a control section, the fuel handling section arranged to handle the introduction and metering the liquid alcohol fuel into the combustion chamber by at least one control needle in the fuel injection valve, and the control section being a hydraulic control section fluidly separated from the fuel handling section.

2. A fuel injection unit according to claim 1, wherein the second fuel feeding section is arranged to inject a pilot fuel for compression ignition purposes.

3. A fuel injection unit according to claim 1, wherein the fuel injection unit is provided with a flow channel for a control fluid separated from the first fuel section and connectable to a control valve external to the fuel injection unit.

4. A fuel injection unit according to claim 1, wherein the pressure of a control fluid is arranged to determine the operational status of the injection valve when in use.

5. A fuel injection unit according to claim 1, wherein the fuel injection unit comprises at least two successive body parts, wherein the first fuel section extends from the first body part to the second body part, and wherein a crossover location of the first fuel section between the first body part to the second body part comprises a first sealing system, and the first sealing system is surrounded by a sealing chamber connectable to a source of sealing liquid when in use.

6. A fuel injection unit according to claim 1, wherein the first fuel section between the flow fuse and the fuel injection valve is arranged to cause a pressure loss of less than 200 bar in all operational circumstances of the fuel injection unit.

7. A fuel injection unit according to claim 1, wherein the control section is provided with a control valve, which is arranged to apply the pressure of a control fluid system to the control section of the fuel injection unit which causes closing of the at least one control needle, and to depressurize the control section, which causes the opening of the at least one control needle.

8. A fuel feeding arrangement comprising:

a fuel injection unit according to claim 1, and a first fuel system with at least one high pressure fuel pump which is arranged to pressurize the fuel to the injection pressure coupled to the fuel injection unit, a second fuel system with at least one high pressure fuel pump which is arranged to pressurize the fuel to the injection pressure coupled to the fuel injection unit, wherein the control section of the first fuel feeding section of the fuel injection unit is provided with a control valve, which is arranged to apply the pressure of control fluid system to the control section of the first fuel feeding section which causes closing of at least one control needle, and to depressurize the control section, which causes the opening of at least one control needle, and the control valve arranged externally to the fuel injection unit.

9. A fuel feeding arrangement according to claim 8, wherein the control section is connected with the control valve by an external pipe.

10. A fuel feeding arrangement according to claim 8, wherein the fuel injection unit comprises at least two successive body parts, the first fuel section extends from the first body part to the second body part, the crossover location comprises a first sealing system and the first sealing is surrounded by a sealing chamber connectible to a source of sealing liquid when in use, wherein the sealing chamber is connected to an external source of sealing liquid.

11. A fuel feeding arrangement according to claim 8, wherein the first fuel system comprises a secondary pressure accumulator dedicated for the first fuel feeding section of the fuel injection unit.

12. A fuel feeding arrangement according to claim 8, wherein the first fuel system comprises a secondary pressure accumulator dedicated for the first fuel feeding section of the fuel injection unit and the first fuel feeding section comprises an integrated accumulator in the fuel injection unit and wherein the total volume of the integrated accumulator and the secondary accumulator is designed so that the capacity is of 20 to 60 times the injection quantity during one combustion stage.

13. A fuel feeding arrangement according to claim 8, wherein the first fuel feeding section comprises an integrated accumulator in the fuel injection unit.

14. A fuel injection unit according to claim 5, wherein the sealing chamber is further connected to a needle guide of the first fuel section.

15. A fuel injection unit for assembly to a cylinder head and for injecting first and second fuel to a cylinder of an internal combustion piston engine, the fuel injection unit comprising:

a first fuel feeding section in the fuel injection unit for injecting a liquid alcohol fuel to the internal combustion engine, the first fuel feeding section having an injection valve, in which the fuel injection valve in the first fuel feeding section comprises a fuel handling section and a control section, and a second fuel feeding section in the fuel injection unit, separate from the first fuel feeding section, for injecting a liquid fuel to the internal combustion engine, the second fuel feeding section having an injection needle, a pressure accumulator in the first fuel feeding section arranged within a body of the injection unit, the fuel handling section arranged to handle the introduction and metering the liquid alcohol fuel into the combustion chamber by at least one control needle in the fuel injection valve, and the control section being a hydraulic control section fluidly separated from the fuel handling section, wherein the fuel injection unit comprises at least two successive body parts, wherein the first fuel section extends from the first body part to the second body part, and wherein a crossover location of the first fuel section between the first body part to the second body part comprises a first sealing system, and the first sealing system is surrounded by a sealing chamber connectable to a source of sealing liquid when in use, and the sealing chamber is further connected to a needle guide of the first fuel section.

* * * * *